United States Patent
Glass et al.

[11] Patent Number: 5,661,958
[45] Date of Patent: Sep. 2, 1997

[54] SIZE-ADJUSTABLE COMPOSITION HORSEBOOT

[75] Inventors: Neel W. Glass, Santa Fe, N. Mex.; Garrett Nolan Ford, Catalina; Rudolph S. Cyprian, Tucson, both of Ariz.

[73] Assignee: Easycare, Inc., Oro Valley, Ariz.

[21] Appl. No.: 423,821

[22] Filed: Apr. 14, 1995

[51] Int. Cl.$^6$ ................... A01L 3/00; A01L 5/00
[52] U.S. Cl. ..................... 54/82; 168/18
[58] Field of Search .................. 168/1, 18, 19; 54/82

[56] References Cited

U.S. PATENT DOCUMENTS

| | | | |
|---|---|---|---|
| 70,035 | 10/1867 | Sloat | 168/18 |
| 3,703,209 | 11/1972 | Glass | 168/18 |
| 3,732,929 | 5/1973 | Glass | 168/18 |
| 4,155,406 | 5/1979 | Hourlier | 54/82 X |
| 4,174,754 | 11/1979 | Glass | 168/18 |
| 5,588,288 | 12/1996 | Origgi et al. | 54/82 |

FOREIGN PATENT DOCUMENTS 1408336  10/1975  United Kingdom ........ 168/18

*Primary Examiner*—Robert P. Swiatek
*Attorney, Agent, or Firm*—Joseph W. Mott; Antonio R. Durando

[57] ABSTRACT

A horse boot of the type having a sole and flexible envelope with re-entrant folds for surounding the hores's hoof below the coronary band is improved by adding a movable back strap and movabale toothed side gripping plates capable of sliding forward during attachment of the boot. This modification provides an adjustable fit boot that better secures the boot to the hoof in a self-adjusting and natural way.

7 Claims, 3 Drawing Sheets

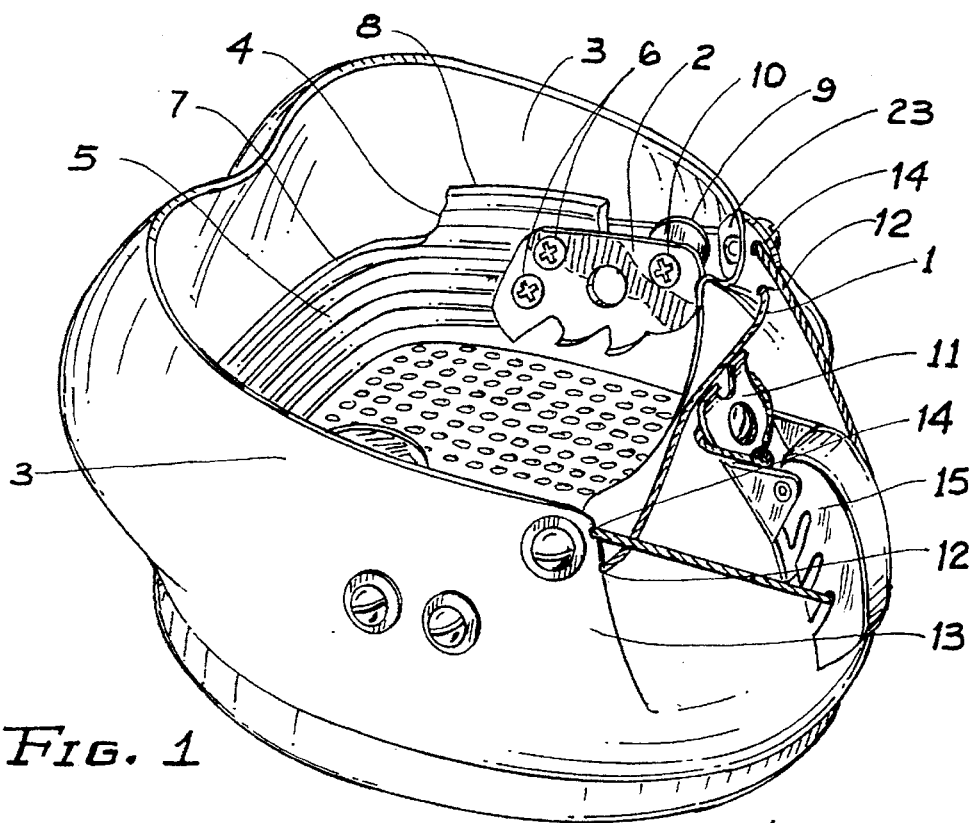
FIG. 1
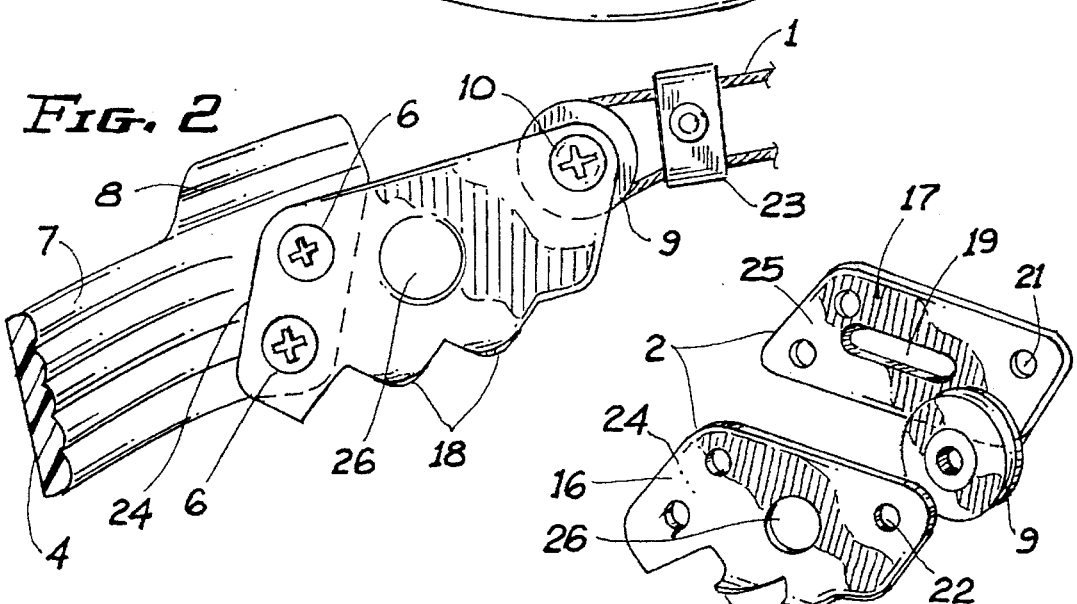
FIG. 2
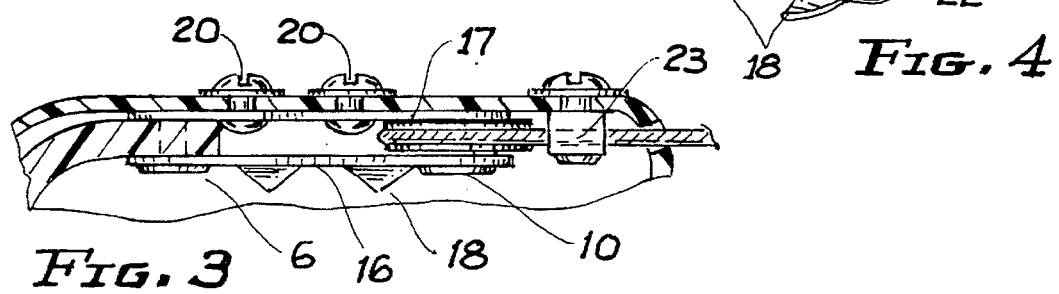
FIG. 3
FIG. 4

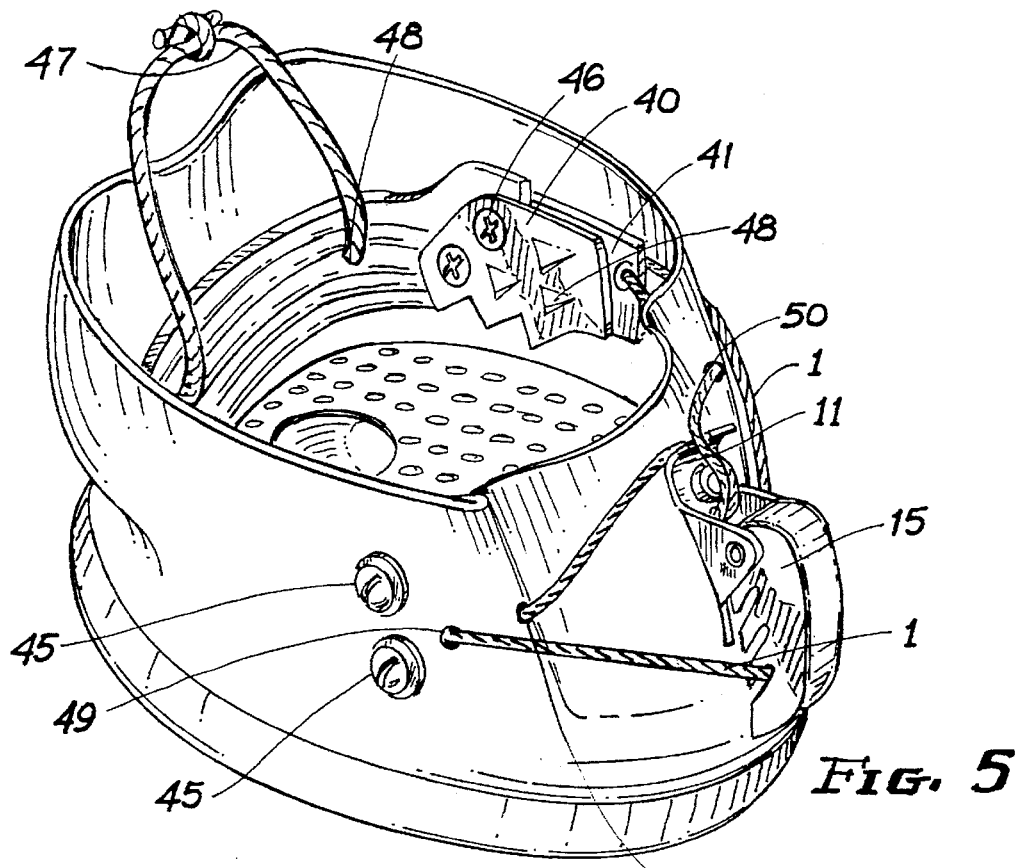
FIG. 5
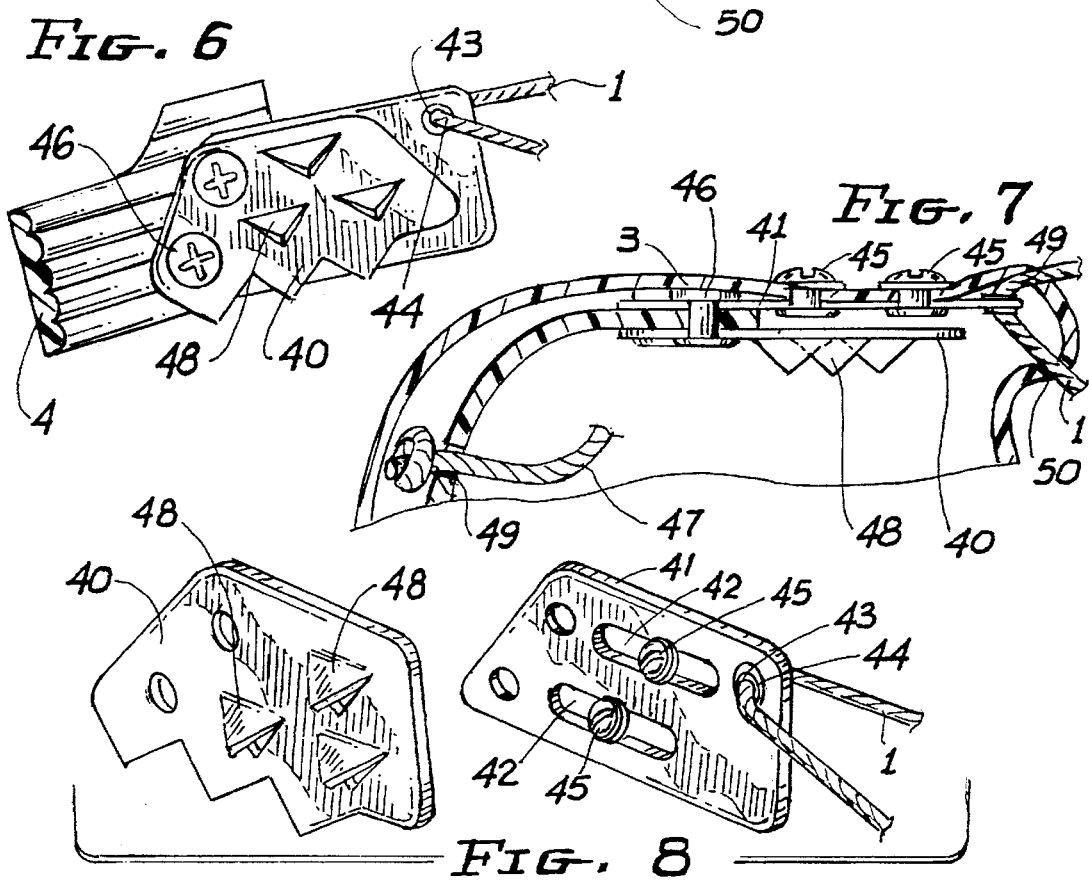
FIG. 6
FIG. 7
FIG. 8

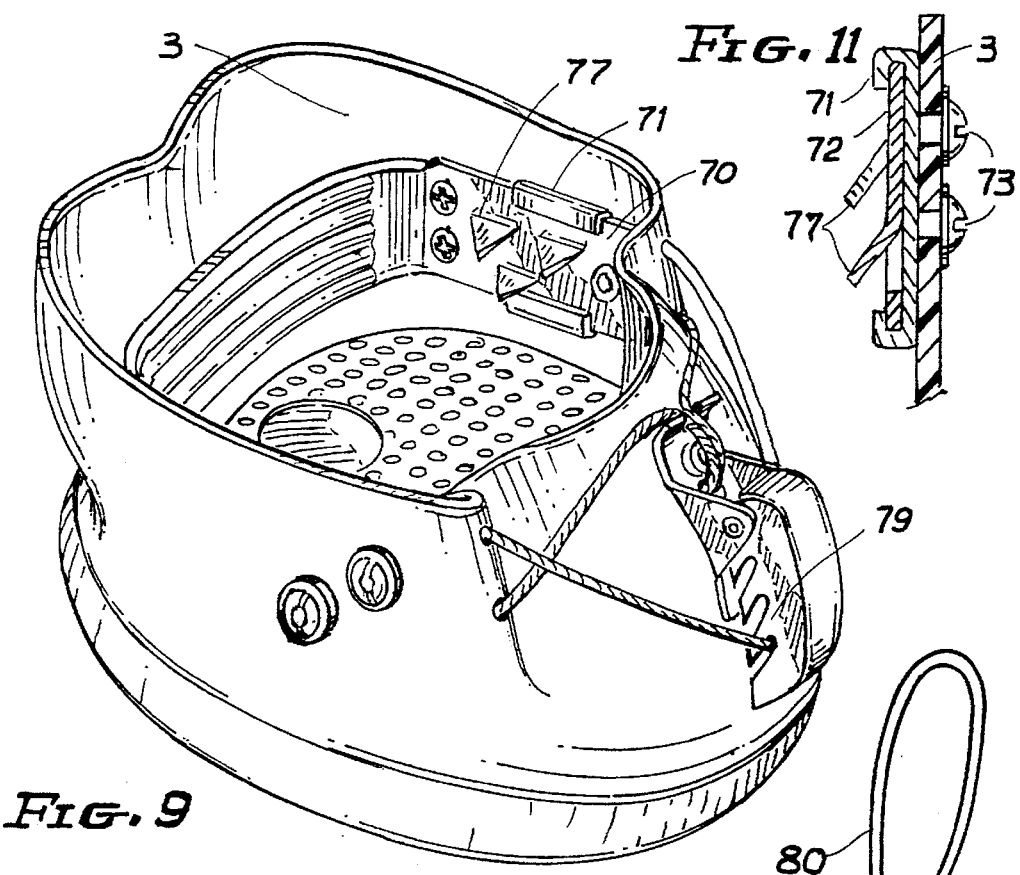
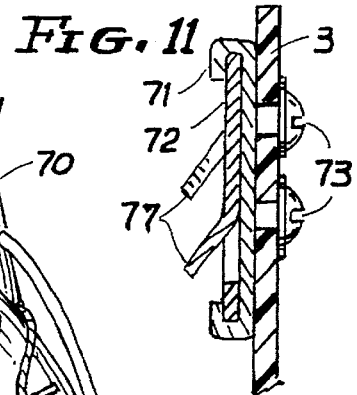
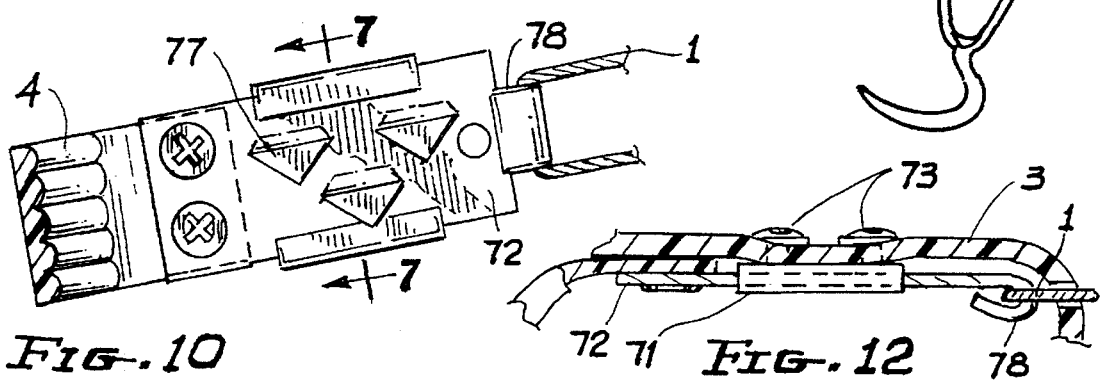
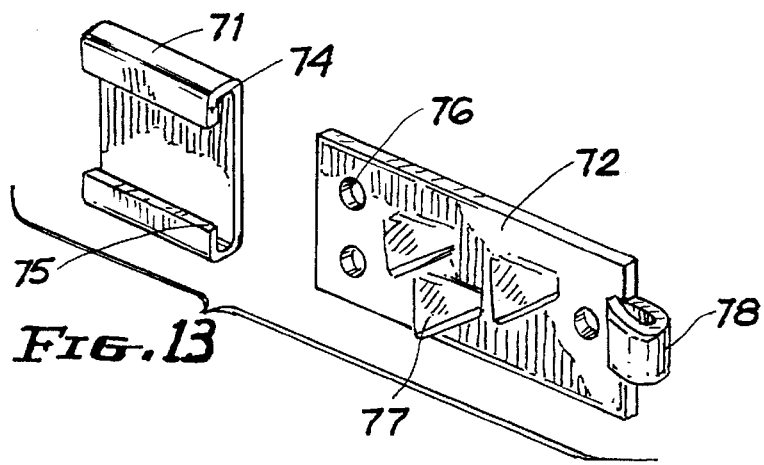

5,661,958

SIZE-ADJUSTABLE COMPOSITION HORSEBOOT

FIELD OF THE INVENTION

This application relates to an improvement in composition horseshoes or horseboots particularly of the type disclosed in U.S. Pat. Nos. 3,732,929 (May 15, 1973), 3,703,209 (Nov. 21, 1972) and 4,174,754 (Nov. 20, 1979), all issued to Neel W. Glass.

BACKGROUND OF THE INVENTION

The above patents disclose a composition horseshoe or horseboot having a sole and a somewhat flexible envelope for surrounding the horse's hoof below the coronary band. The envelope has a pair of re-entrant folds one on each side wall of the envelope on an upper portion of the side wall. Tensioning means engaged either external brackets having a plurality of outwardly directed projections for adjustability or internal grooved means such as a cable slip or pulley. The boots are snugged to the horse's hoof using a center toggle buckle to tighten the cable and compress the envelope about the hoof. In the later version, a strap around the rear of the hoof is provided, and downwardly slanting projecting barbs protrude from the internal brackets on either side to provide non-slipping engagement with the side walls of the horse's hoof when the shoe is snugged on the horse's hoof.

This arrangement is satisfactory, but has some disadvantages that are addressed by the improvements of the present invention. In the configuration shown in U.S. Pat. No. 4,174,754, the side plates and rear serrated strap are rigidly fixed to the side walls of the boot. This has the effect of limiting the size of hoof that the boot will fit, since the distance from the back of the serrated strap to the front or "toe" of the boot is fixed. In practice, this limitation has made it necessary to stock several sizes of boot to ensure appropriate fit.

SUMMARY OF THE INVENTION

To avoid this disadvantage, it is desirable to add an adjustable mechanism to the boot to allow variation of the distance from the back of the serrated strap to the toe of the boot. The present invention provides a mechanism to allow the serrated strap a limited amount of travel forward and back in a horizontal plane, parallel to the sole of the boot. This is accomplished by slidably affixing the serrated strap to the side walls using slotted or channelized plates so that the appropriate freedom of movement is facilitated. Thus, it is a prime objective of the present invention to provide an adjustable fit boot which still has the advantages of easy application and removal by constriction of the boot envelope.

It is a further objective of the invention to make it easier to insert the animals' hoof into the boot, by permitting the boot to be somewhat longer than the hoof prior to tightening.

It is a further objective of the invention to better secure the rear strap of the boot to the hoof in a self-adjusting and natural way.

It is a further objective of the invention to provide an improved secure contact between the hoof and the toothed side gripping plates of the prior art by moving the gripping plates relative to the hoof.

The above objectives, together with other advantages which will subsequently become apparent, reside in the details of the construction, arrangement and combination of the several parts and features described herein.

BRIEF DESCRIPTION OF THE DRAWINGS

FIG. 1 is a downwardly inclined perspective view of one version of the horseboot of the present invention.

FIG. 2 is a side view of the side plate configuration in FIG. 1.

FIG. 3 is a downward view of the side plate configuration in FIG. 1.

FIG. 4 is an exploded view of the side plate configuration in FIG. 1.

FIG. 5 is a perspective view of another version of the horseboot of the present invention.

FIG. 6 is a side view of the side plate assembly in FIG. 5.

FIG. 7 is a front cross section view for the side plate assembly in FIG. 5.

FIG. 8 is a downward view of the side plate assembly in FIG. 5.

FIG. 9 is an exploded view of the side plate assembly in FIG. 5.

FIG. 10 is a perspective view of another version of the horseboot for the present invention.

FIG. 11 is a side view of the side plate assembly in FIG. 10.

FIG. 12 is a downward view of the side plate assembly in FIG. 10.

FIG. 13 is an exploded view of the side plate assembly in FIG. 10.

DETAILED DESCRIPTION OF THE INVENTION

The horseboot of the prior art is shown in U.S. Pat. No. 4,174,754, the disclosure of which is incorporated herein by reference. This horseboot includes a continuous cable which engages side plates secured inside the boot side walls. An internal strap is affixed at each end to the side wall of the boot along with the rearward end of the side plates by a pair of fasteners. A slide shoe is mounted on a rivet near the front edge of the side plate on each side of the boot.

The cable is secured to a cable anchoring bracket on the exterior front of the boot and passes through apertures in the outer folds, which are positioned tangential to the lower part of the slide shoes. The cable passes over each slide shoe and exits from the interior of the boot through upper apertures, and is engaged by an over-center buckle. The constriction mechanism for securing the prior art horseboot to a horse's hoof is a continuous loop comprising the serrated strap, the side plates, the slide shoes, the cable, the bracket and the over-center buckle.

As a consequence of being attached to the sidewalls by fasteners and rivets, the side plates have no freedom of movement other than that imparted by the flexibility of the sidewalls. This leaves the constriction of the re-entrant folds as the sole tightening or snugging mechanism of the prior art horseboot. Moreover, the front-to-back dimension from the rear serrated strap to the interior front surface of the boot is fixed in the prior art configuration.

To improve the effective operation of the horseboot, it would be useful to permit the rear serrated strap a limited amount of travel forward and back along the sidewalls. The plane of motion should be roughly orthogonal to the line of the main bones of the foot, so the strap is pulled forward and slightly upward. In practice, an upward angle of 20° to 30° from the horizontal is satisfactory. By providing about one half inch (1.3 cm) of such travel, the horseboot becomes much easier to fit on the horse, since the rear strap may be pulled back and loosely fit behind the cartilage heel of the hoof. When the buckle in the inventive configuration is tightened, it pulls the rear strap forward, gently and naturally urging the front of the hoof into the toe of the boot. Moreover, this forward movement causes a slight forward displacement of the side plates relative to the hoof, in turn causing the inwardly and downwardly inclined teeth on the side plates to grip the sides of the hoof more firmly, giving a more secure fit.

One version of the present invention is shown in FIGS. 1–4. The horseboot of FIG. 1 includes a continuous cable 1 which engages side plates 2 which are slidably secured inside the boot side walls 3. An internal strap 4 having elongated downwardly pointing serrated ridges 5 is affixed at each end to the rearward end of the side plates 2 by a pair of fasteners 6. The serrated strap 4 comprises an intermediate elongated portion 7 and expanded end portion 8.

A slide shoe 9 is mounted near the front edge of plate 2. This slide shoe can be a sheave mounted on rivet 10. A similar slide shoe is attached to the side wall and side plate on the opposite side of the boot.

Cable 1 is secured to cable anchoring bracket 11 and passes therefrom to the right and the left to pass through lower apertures 12 in the outer folds 13, which apertures are positioned tangential to the lower part of slide shoes 9. The cable passes over each slide shoe and exits from the interior of the boot through upper apertures 14. The cable is lastly engaged by over-center buckle 15.

In this embodiment of the invention, front-to-back freedom of movement of the side plates along the sidewalls is made possible by constructing the side plate structures as a two part unit. As shown in FIGS. 3 and 4, the side plates each have an inner plate 16 and an outer plate 17. The inner plate is in the same general shape as the single side plate of the prior art, and includes the same inwardly and downwardly inclined gripping teeth 18. The outer plate 17 is roughly rectangular, approximately the same size as the inner plate, and incorporates an elongated hole or slot 19 running front to back about ¾ inches (1.75 cm). The outer plate is slidably affixed to the sidewall of the horseboot by means of a pair of fasteners 20 extending through slot 19. Use of two fasteners in the slot causes the plate to move in a straight line, without rotation. Circular opening 26 in inner plate 16 may be slid into position over each of the fasteners 20 to facilitate tightening of the fastener with a tool.

A hole 21 in the forward part of outer plate 17 corresponds to a matching hole 22 in the inner plate 16. As best seen in FIG. 3, the slide shoe 9 is mounted on a rivet 10 or other fastener device passing through the front part of the inner and outer plates. To alleviate stress on the apertures 12 and 14 in the outer folds 13, positioning guides 23 on the outer wall immediately forward of the slide shoes may be employed. These guides, which may be metal brackets adapted to slidably guide cable 1 from slide shoes 9 to apertures 12 and 14, assure that the outer wall material does not tear at the apertures. Near the rearward edges 24, 25 of the inner and outer plates of the side plates, the serrated rear strap 4 is attached to the side plates on each side of the boot by fasteners 6. This may be accomplished by means of rivets, threaded screws, or other methods.

From the foregoing it is seen that the constriction mechanism for securing the horseboot to the hoof is a continuous loop comprising serrated strap 4, side plate assemblies 2, slide shoes 9, cable 1, bracket 11 and overcenter buckle 15. When the buckle is tightened, serrated strap 4 is pulled forward and cooperates with the constriction of the re-entrant folds in the front of the horseboot to snugly confine the horseboot on the hoof, leaving a small gap (up to a half inch (1.3 cm)) between strap 4 and the rear wall of the horseboot. The forward movement of the side plates causes the gripping teeth on the side plates to penetrate and grip the hoof as the hoof is pulled to the front of the boot, causing the boot to firmly attach to the hoof.

Another embodiment of the invention is shown in FIGS. 5–8. The side plate structures are also two-part units, as more particularly shown in FIG. 8, comprising an inner plate 40 and an outer plate 41. The outer plate 41 incorporates a pair of approximately ¾" (1.75 cm) horizontal slots 42, one above the other, and a hole 43 with a re-enforcing eyelet 44 near the intersection of the forward upper edges. The outer plate is slidably attached to the sidewall by means of fasteners 45 extending through slots 42.

Cable 1 engages the outer plate by passing through hole 43 and its reinforcing eyelet 44, which keeps the plate edge inside the hole from binding or cutting the cable. Strap 4 is rigidly affixed to inner plate 40 and outer plate 41 with screws, rivets, or other fasteners 46. A lifting loop 47 may be attached to strap 4 by, for example, drilling a pair of holes 48 in strap 4 and threading and tying a one-eighth inch (3 mm) or one-sixteenth inch (1.5 mm) nylon cord. This lifting loop is used to pull up the back as the horseboot is mounted, functioning like the standard bootstraps on a person's boot. The lifting loop may be useful with other embodiments of the invention as well.

The inner plate 40 of the side plate structure in FIGS. 5 through 9 is approximately the same size as the outer plate 41, but, as best seen in FIG. 6, has its top forward corner cut off to leave clearance for cable 1. The inner plate incorporates a plurality of downwardly and inwardly slanting projecting barbs 48, and is affixed to strap 4 and outer plate 41. As shown in FIG. 6, the same fasteners 49 may be used to secure the inner plate, strap and outer plate together.

The tightening cable 1 passes through an aperture 49 in the side wall adjacent to hole 43 in the outer plate and through an aperture 50 in the front wall above the top reentrant fold and at substantially the same height above the sole as aperture 49. This configuration does not need a positioning guide as employed in the embodiment of FIG. 1.

As can be readily seen, the constriction method for securing this embodiment of the horseboot to the hoof is a continuous loop comprising serrated strap 4, side plate assemblies 40 and 41, cable 1 passing through eyelets 43, bracket 11 and overcenter buckle 15. When the buckle is tightened, serrated strap 4 cooperates with the remaining elements in the same way as the previous embodiment.

Still another embodiment of the invention is shown in FIGS. 10 through 13, which illustrate the use of a sliding two part interlocking plate system as the side plates. Side plate 70 is made up of a channel plate 71 and an inner plate 72. Channel plate 71, which is affixed to the outer wall 3 with fasteners 73 is a rectangular plate with its upper edge 74 bent downward and its lower edge 75 bent upward to form a pair of channels. Inner plate 72 is a generally rectangular plate which fits slidably into the channels of channel plate 71, so that it may move forward and back. Inner plate 72 includes one or more rear holes 76 through which fasteners may be placed to affix serrated strap 4 to inner plate 72. The length of travel of the side plates in this configuration may be regulated by shortening or lengthening tightening cable 1.

Inner plate 72 also incorporates downwardly, inwardly and forward slanting projecting barbs 77 and a cable engaging means 78. The cable engaging means illustrated in FIG. 13 is a loop tab fashioned by bending back a projection of the inner plate. The slide shoe in FIG. 2 or the hole with reinforcing eyelet in FIG. 8 could also serve as a cable engaging means. The tightening cable 1 passes through upper apertures in the front wall, engages the cable engaging means 78, passes through lower apertures in the front wall, and engages the overcenter buckle in the same manner as the previously described embodiments. This embodiment also shows a tunnel 79 approximately one-eighth inch (3.5 mm) in diameter which may be bored into the buckle 15 to assist in opening the horseboot; a suitable leverage-enhancing device such as a hoof pick 80 may be inserted into tunnel 79 to pull up a tight buckle when the horseboot is to be removed. The bored tunnel may be useful with other configurations of the invention as well.

The constriction mechanism for securing this embodiment to the hoof is a continuous loop comprising serrated strap 4, side plate 72 cable 1 passing through cable engaging means 78, and overcenter buckle 15. Its operation is the same as in the previously-described embodiments.

Although the present invention has been described in considerable detail with reference to certain preferred versions thereof, other versions are possible. Therefore, the spirit and scope of the appended claims should not be limited to the description of the preferred versions contained herein.

What is claimed is:

1. An improved composition molded horse boot of the type comprising: an integral sole and front, rear, left side and right side walls; re-entrant folds on either side of the front wall; a pair of side brackets affixed to the side walls; a back strap inside the rear wall of the boot attached to the side brackets; a continuous loop cable anchored to the front wall, passing inward through the front wall on either side to engage each of the side brackets, and passing out through the front wall; and an over-center tightness adjusting buckle engaging the cable; the improvement comprising modified side brackets slidably attached to the side walls, enabling the brackets and the back strap to move, responsive to a tightening of the cable using the buckle, forward about one-half inch (1.3 cm) in the plane approximately orthogonal to the plane of the horse's foot bones.

2. The horse boot of claim 1 wherein the side brackets comprise an outer plate incorporating an elongated hole and an inner plate, said outer plate being slidably attached to the side wall by a pair of fasteners through the elongated hole, and said plates being rigidly attached to each other and to said back strap near a rear edge of the plates, and to each other and to a cable engaging means near a front and an upper edges of the plates.

3. The horse boot of claim 2 wherein the cable engaging means is a sheave mounted between the inner and outer plates.

4. The horse boot of claim 1 wherein the side brackets comprise an outer plate incorporating upper and lower elongated holes and an inner plate; said outer plate being slidably attached to the side wall by a pair of fasteners, one through each of the elongated holes; said plates being rigidly attached to each other and to said back strap near a rear edge of the plates; and said brackets including a cable engaging means at a forward edge of one of the plates.

5. The horse boot of claim 1 further comprising a lifting loop attached to the back strap.

6. The horse boot of claim 1 further comprising a tunnelled opening in the buckle for inserting a leveraging tool to open the buckle.

7. The horse boot of claim 1 wherein the side brackets comprise an outer channel plate rigidly affixed to the side wall and an inner plate slidably engaging the outer channel plate; said inner plate being affixed to the back strap at one end and including a cable engaging means at the other end.

* * * * *